United States Patent [19]

Cashin

[11] Patent Number: 5,652,642
[45] Date of Patent: Jul. 29, 1997

[54] COMBINATION DIGITAL AND ANALOG SOUNDTRACK SYSTEM AND METHOD

[76] Inventor: James A. Cashin, 18730 Oxnard St. #208, Tarzana, Calif. 91356

[21] Appl. No.: 402,712

[22] Filed: Mar. 13, 1995

[51] Int. Cl.⁶ .................. G03B 31/02; G03B 31/00
[52] U.S. Cl. .................. 352/27; 352/37; 352/92
[58] Field of Search ............... 354/5; 352/5, 27, 352/37, 92, 236; 369/94, 2; 235/487

[56] References Cited

U.S. PATENT DOCUMENTS

| | | | |
|---|---|---|---|
| 3,281,151 | 10/1966 | Kaprelian et al. | 352/5 |
| 3,969,593 | 7/1976 | Vlahos | 369/94 |
| 4,090,031 | 5/1978 | Russell | 365/127 |
| 4,663,518 | 5/1987 | Borror et al. | 235/487 |
| 4,826,976 | 5/1989 | Borror et al. | 544/58.4 |
| 5,155,510 | 10/1992 | Beard | 352/27 |
| 5,239,338 | 8/1993 | Pearson et al. | 355/32 |
| 5,327,182 | 7/1994 | Kohut et al. | 352/27 |
| 5,471,263 | 11/1995 | Odaka | 352/27 |

*Primary Examiner*—D. Rutledge

[57] ABSTRACT

The present invention overcomes the wear and tear problems caused by prior art methods by placing the digital information in the space reserved for analog soundtrack information, which traditionally is not touched by transport rollers or pressure plates. This invention describes a method by which digital information is simultaneously recorded with the analog track in the same area occupied by the present analog track by utilizing the techniques of spectral processing and digital bit manipulation. Thus, maximum separation and minimal interference can be achieved between the digital and analog tracks.

24 Claims, 5 Drawing Sheets

COMBINATION DIGITAL AND ANALOG SOUNDTRACK SYSTEM AND METHOD

BACKGROUND OF THE INVENTION

Field of the Invention

The invention relates to the field of encoding digital and analog information onto photographic film.

BACKGROUND OF THE INVENTION

In the prior art, during the late 1920's, a process was developed whereby monophonic analog sound was recorded photographically on black and white motion picture film. In order to decode the sound, a tungsten lamp was focused through a slit onto the film on which the sound was recorded and thereafter onto a photoelectric pickup device, where it was then processed into sound.

When color film was introduced in the 1950's, the process that had been previously used on black and white films to record an analog soundtrack would not work. The reason was that the color dyes used in making the film transmitted infrared light whereas the silver used on black and white film blocked infrared light. Since the light sources used to decode the soundtrack contained high amounts of infrared energy, it could not read the film modulation and created a great deal of noise. Therefore, it became necessary to add a black and white silver process in the soundtrack area to the color film.

Specifically, after the picture was developed in full color, the area in which the soundtrack was to be recorded was covered with a silver emulsion, exposed to light, and thereafter developed as a black and white film. While this process produced a high quality analog soundtrack, the addition of the black and white soundtrack process to the color picture process substantially increased the cost and complexity of making release prints.

In the 1970's and 1980's, the monophonic analog track was replaced with a stereo soundtrack. A noise reduction system was also included to improve the dynamic range.

Thereafter, other processes were introduced to place multiple discrete channels of sound on a motion picture film. For example, in U.S. Pat. No. 3,969,593, Vlahos introduced a multichannel analog system using different color dye layers.

In the late 1980's several companies introduced digital sound with motion picture film. The Cinema Digital Sound process ("CDS") invented by Eastman Kodak and Optical Radiation Corporation replaced the analog track with digital bits. Unfortunately, the process failed because the prints also did not contain an analog soundtrack and, thus, could not be played on standard projectors.

At the present time, there are two commercially successful sound processes which involve placing digital soundtracks onto film. Dolby developed a process which places digital information between the sprocket perforations near the edge of the film and leaves the analog track in the standard position next to the picture. Sony also developed a process (known as SDDS) whereby digital information is placed on the outside edges of the film and the analog track is left in the standard position.

One serious shortcoming of both the Dolby and Sony systems is that dense digital information must be placed in the areas of the 35 mm film that are touched by transport rollers and/or pressure plates. Thus, the areas are subjected to substantial wear and tear, causing the film to become scratched, cracked and ripped in these areas. Thus the sound degrades over time. In addition, in the Dolby system, the decoder requires special optical readers with precise timing and extensive digital processing to capture and decode the information that is between the sprockets. Now, with the ever increasing public concern for the environment, film manufacturers are being pressured to omit the silver emulsion processing altogether and leave only the color dye processing on all 35 mm prints. Thus, a system and method are needed that are specifically designed to create a high quality analog and digital soundtrack on color dye films which omit the silver emulsion processing.

SUMMARY OF THE INVENTION

The present invention comprises a method and a system which overcome the wear and tear problems caused by prior art methods and devices by placing the digital or alternative soundtrack in the space reserved for the analog soundtrack. This space traditionally is not touched by transport rollers or pressure plates.

In the present invention, the digital or alternative information simultaneously is recorded in the same area occupied by the present analog track by utilizing the technique of spectral processing, digital bit manipulation or both. Thus, maximum separation and minimal interference will be achieved between the digital and analog soundtracks.

Typical color dye film is composed of three dye layers—a magenta dye layer, a cyan dye layer, and a yellow dye layer. While the yellow layer is not effective for encoding an analog sound-track, it can be used to encode the digital or alternative information, as is set forth in the present invention. A blue light source is used to illuminate the film so the digital or alternative information encoded onto the yellow layer can be read.

In order to minimize interference between the digital and analog information, the technique of digital bit manipulation is used. The digital information is placed on the film in such a way as to maintain equal or nearly equal areas of clear and opaque on each row. Since the analog reader detects the total amount of light transmission change over time, the technique of maintaining constant clear and opaque areas will substantially reduce the pickup of digital noise by analog systems.

The present invention also uses several error compensation processes. The simplest process repeats the digital data three times over a several foot span. The second repeat reverses the left and right data to minimize the effects of longitudinal scratches.

Using the process of the present invention, release prints can be made from color negatives containing analog and digital information on separate dye layers. The printer light source is modified to produce narrow spectrum high intensity, yellow and blue illumination.

In addition, either or both soundtracks can be reproduced with a minimum of interaction between them.

DESCRIPTION OF PREFERRED EMBODIMENTS

This invention describes a method and a system by which digital or other information can be simultaneously recorded in the same area occupied by the present analog track with enhanced separation through use of spectral processing and/or digital bit manipulation.

While it is relatively easy to record different data on different color layers, it is considerably more difficult to maintain adequate isolation and separation between the data so that noise does not become a problem. The techniques of the present invention vastly improve data isolation when recorded on separate color dye layers.

Figure 3:
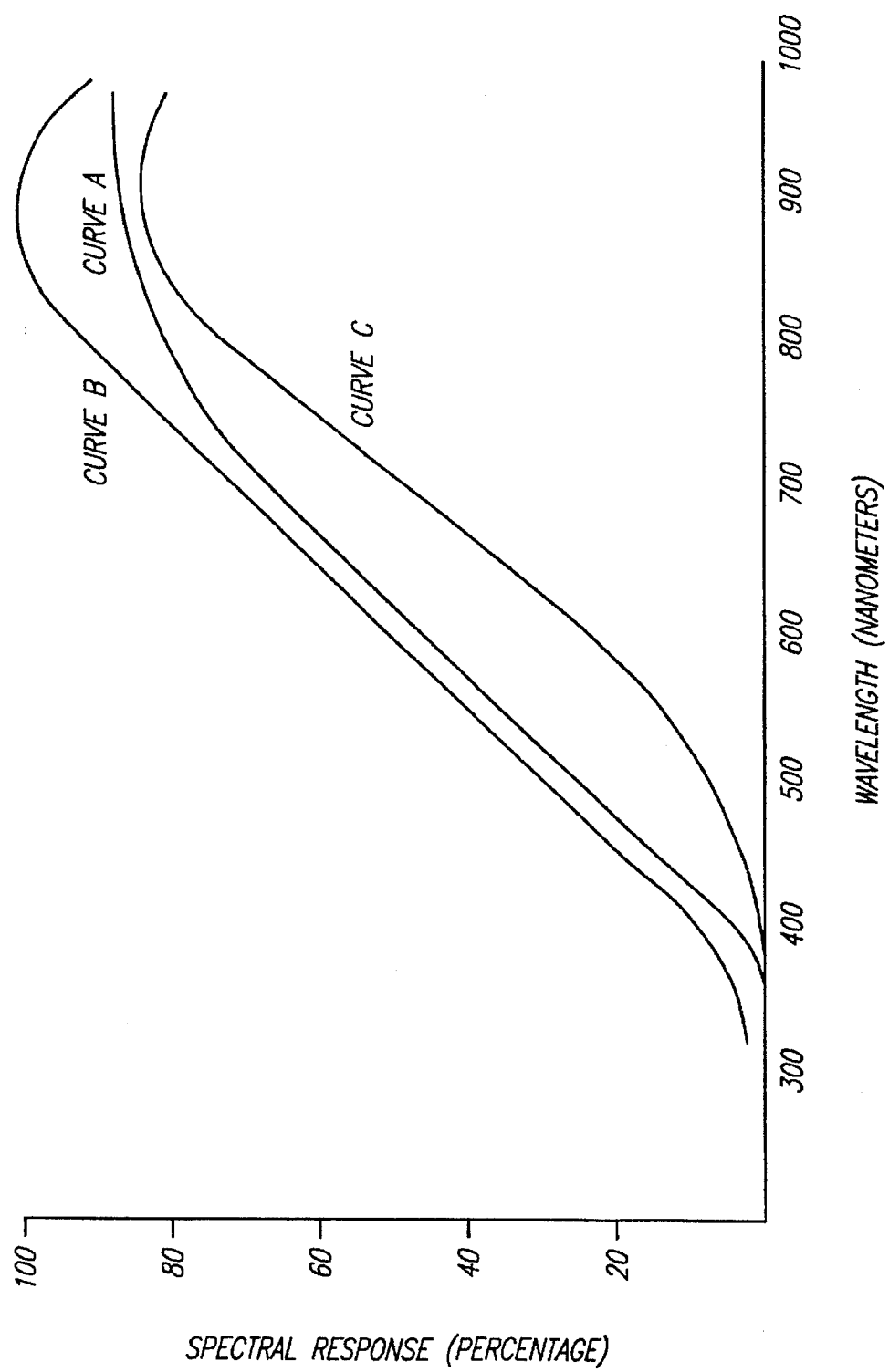
FIG. 3 is a graph illustrating the typical spectral response of a tungsten light source, photoelectric cell and the light source and photoelectric cell combined.

Traditionally, analog soundtracks are read using a tungsten light source with a spectral characteristic as shown in FIG. 3 by Curve A. The majority of this light energy is in the infrared region above 700 nanometers. While a silver emulsion blocks infrared light, color dye layers do not as can be seen by reviewing FIG. 4. Thus, for an analog color dye soundtrack on which there is no silver emulsion, to be playable on a standard projector, the infrared component of the tungsten light source must be removed.

The preferred embodiment of the present invention comprises fitting existing projectors with an inexpensive infrared blocking filter or changing the light source to a narrow spectrum red LED array in order to be able to read the analog information on a film utilizing color dyes rather than silver emulsion. A spectral curve of a typical red LED is pictured in FIG. 5.

In standard 35 mm projectors, the tungsten light source scans the analog soundtrack. The analog information modulates the light which is subsequently picked up by a photoelectric cell. A typical spectral response of the photoelectric cell is shown in FIG. 3 as Curve B.

Figure 4:
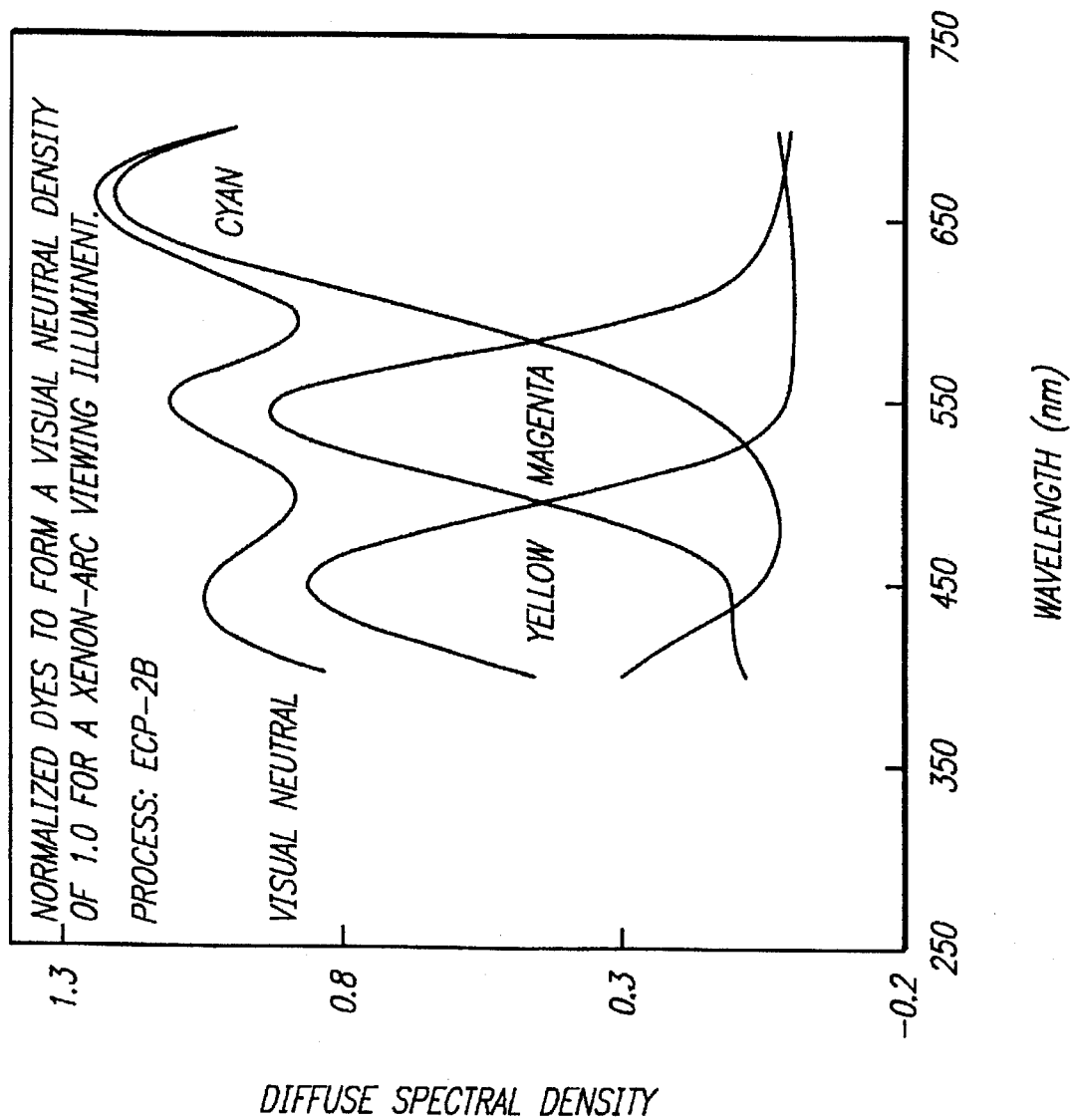
FIG. 4 is a graph illustrating the typical spectral response of the dye layers on color print film.

The combined response of the light source and the photoelectric cell is shown in FIG. 3 as Curve C. When the infrared energy is removed, the remaining energy is primarily in the region of 500 to 700 nanometers. The curves in FIG. 4 illustrate the typical spectral responses of the dye layers on color print film. Between 500 and 700 nanometers, the magenta and cyan dye layers reach maximum density and are, therefore, most effective in modulating the light. Although the yellow layer reaches maximum density in the area of 450 nanometers, the combined response of the light source and the photoelectric cell is less than five percent (5%) efficient in that area. This means that placing analog information on the yellow layer results in less than a five percent (5%) contribution to the overall modulation effect. Conversely, placing different information on the yellow layer results in less than five percent (5%) interference with the analog signal or a 26 db separation between the analog signal and the signal containing different information.

In the near future, due to environmental concerns, it will be necessary for the motion picture industry to omit the silver process and rely totally on color dyes for the analog soundtracks. This opens the use of the yellow layer to encode other information such as a digital soundtrack.

Professional audio equipment requires at least a 60 db separation between different channels. Therefore, the present invention uses the techniques of spectral processing and digital bit manipulation to improve the 26 db separation to acceptable professional levels.

Through the use of spectral processing, the response of the analog reader is minimized in the area of 450 nanometers. For example, placing an absorptive glass or reflective dichroic filter operating below 550 nanometers in front of the tungsten light source and/or photoelectric pickup will easily reduce the 450 nanometers efficiency of the system to below one percent (1%) and increase the separation to over 40 db.

Figure 5:
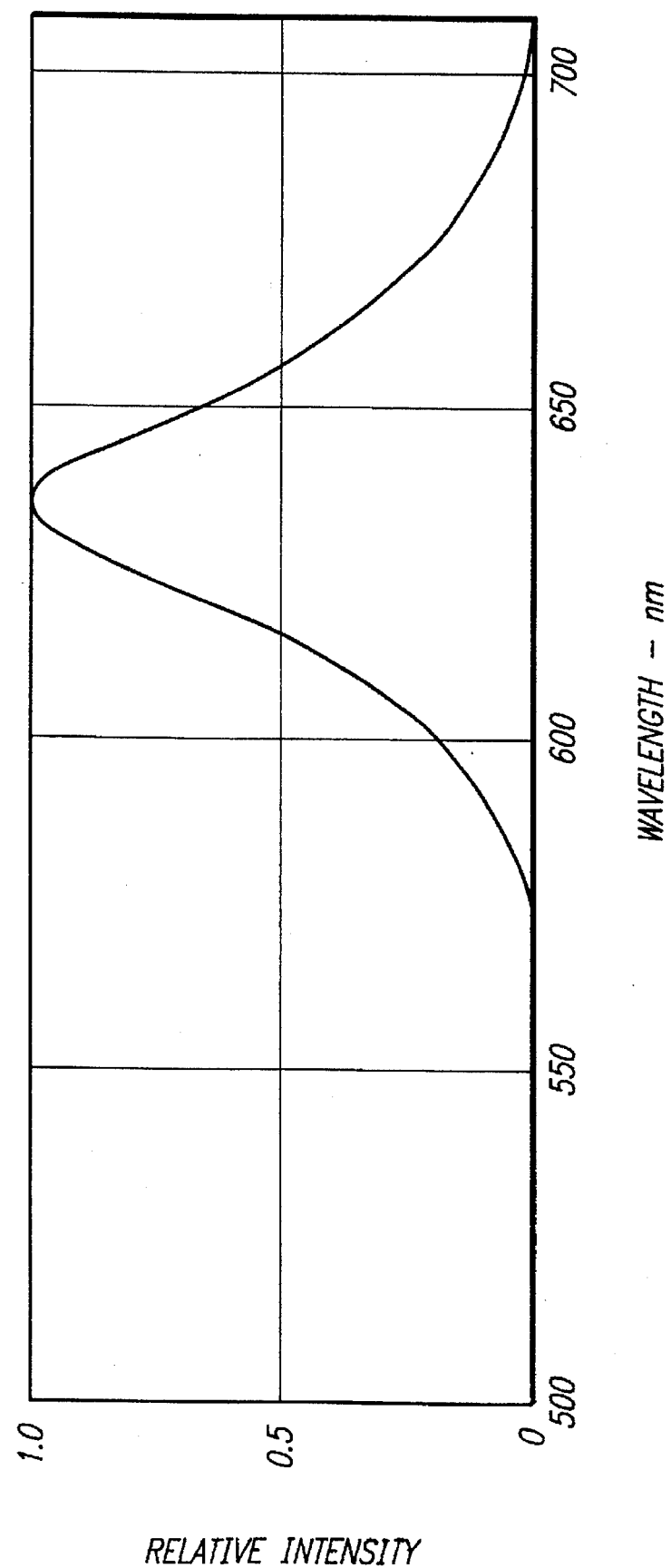
FIG. 5 is a graph illustrating the typical spectral response of a high power red LED array.

Another approach involves replacing the tungsten light source with a high power red LED array with a spectral response as shown in FIG. 5. Referring to FIGS. 4 and 5, it can be seen that the red LED will illuminate analog modulation on the magenta and cyan layers, but will minimally illuminate information on the yellow (450 nanometer) layer. Tests have shown that this spectral processing technique can result in an approximately 50 db separation.

A second technique used in the present invention to provide separation between data is digital bit manipulation. Standard analog readers respond to changes in light intensity over time. If the digital bits are arranged in such a way that each row of data has equal or nearly equal clear and opaque areas, minimal digital information will be reproduced by the analog readers. In practice such a technique results in a 30 to 40 db improvement in separation. By using a 6 to 8 bit transform, as in the present invention, normal digital information can be converted to a pattern of equal clear and opaque areas.

Typically, each six bits of digital information is changed to an eight bit code containing an equal number of digital "0"s and "1"s, e.g. four "0"s and four "1"s. One way that this can be accomplished is through a lookup table that substitutes a special eight bit code for each of the upcoming six bit numbers. This method of conversion causes a loss of approximately 25% of the storage space on the film, while maximizing the separation.

Other conversion codes can be used which result in less loss of storage space on the film but may not maximize the separation. For example, an 8 to 9 transform can be used. While only twelve percent (12%) of the storage space is lost, the transform results in random four "0"s and five "1"s or four "1"s and five "0"s. The uneven distribution of "0"s and "1"s will result in a less than optimum improvement in channel separation. Tests have shown that this transform provides only a 20 db improvement in separation.

In addition, the present invention utilizes a sophisticated high compression algorithm having a compression ratio of at least six (6) to reduce the amount of data being encoded. To keep the system of the present invention flexible so that it could be used with a variety of different compression schemes, several algorithms are stored in the software in the decoder. In addition, a code is placed on the film to identify which decoder should be used and thereafter automatically loads the correct algorithm. As digital compression technology advances, the system will be improved.

The present invention also uses several error compensation processes. The simplest process repeats the digital data three times over a several foot span. The second repeat reverses the left and right data to minimize the effects of longitudinal scratches.

It should be noted that neither the spectral processing nor the digital bit manipulation technique alone reliably produces digital and analog soundtracks with adequate separation. However, when both techniques are combined, a 60 db separation is achieved.

Figure 1:
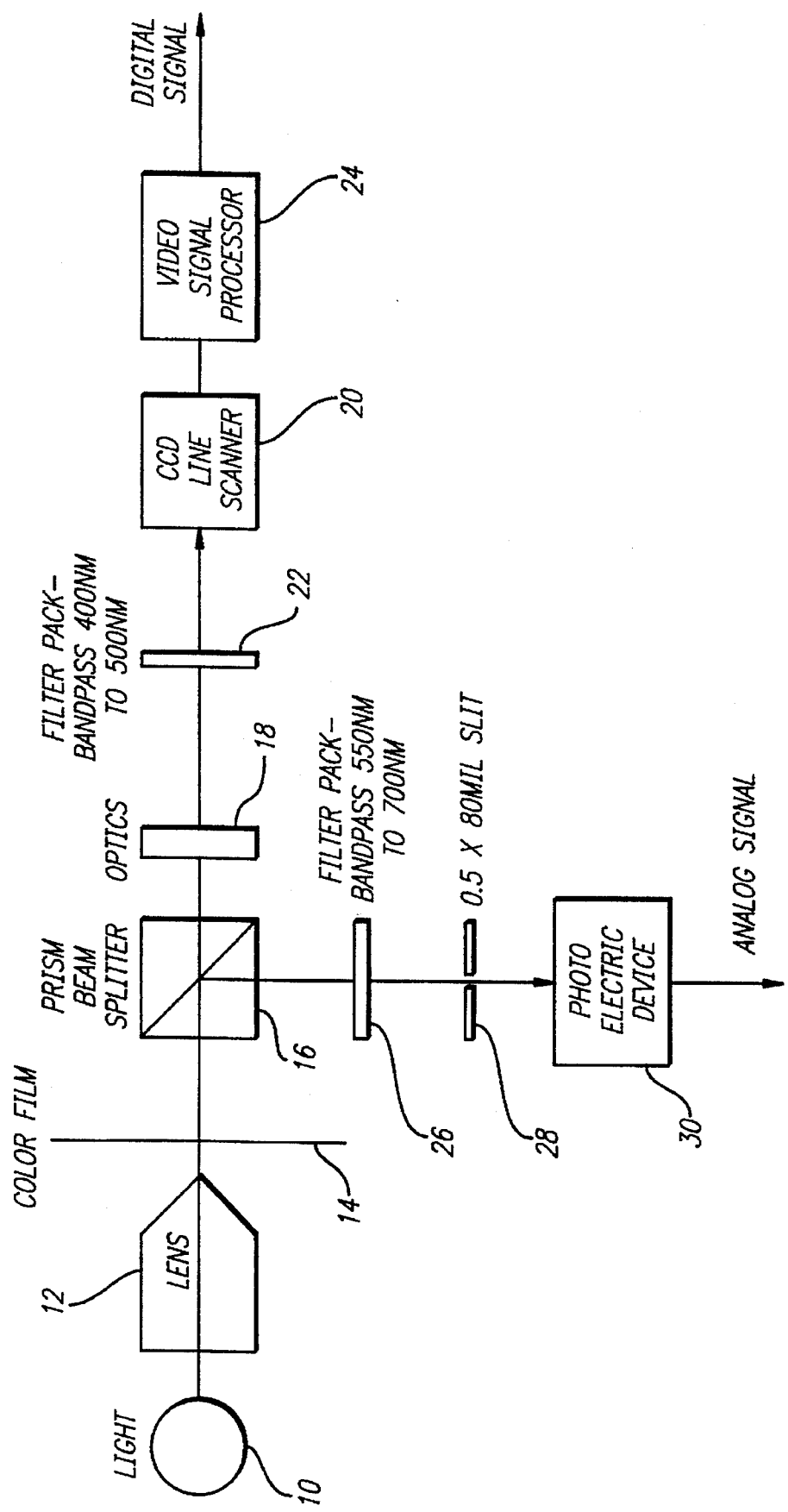
FIG. 1 is a block diagram of one embodiment of the present invention.
Figure 2:
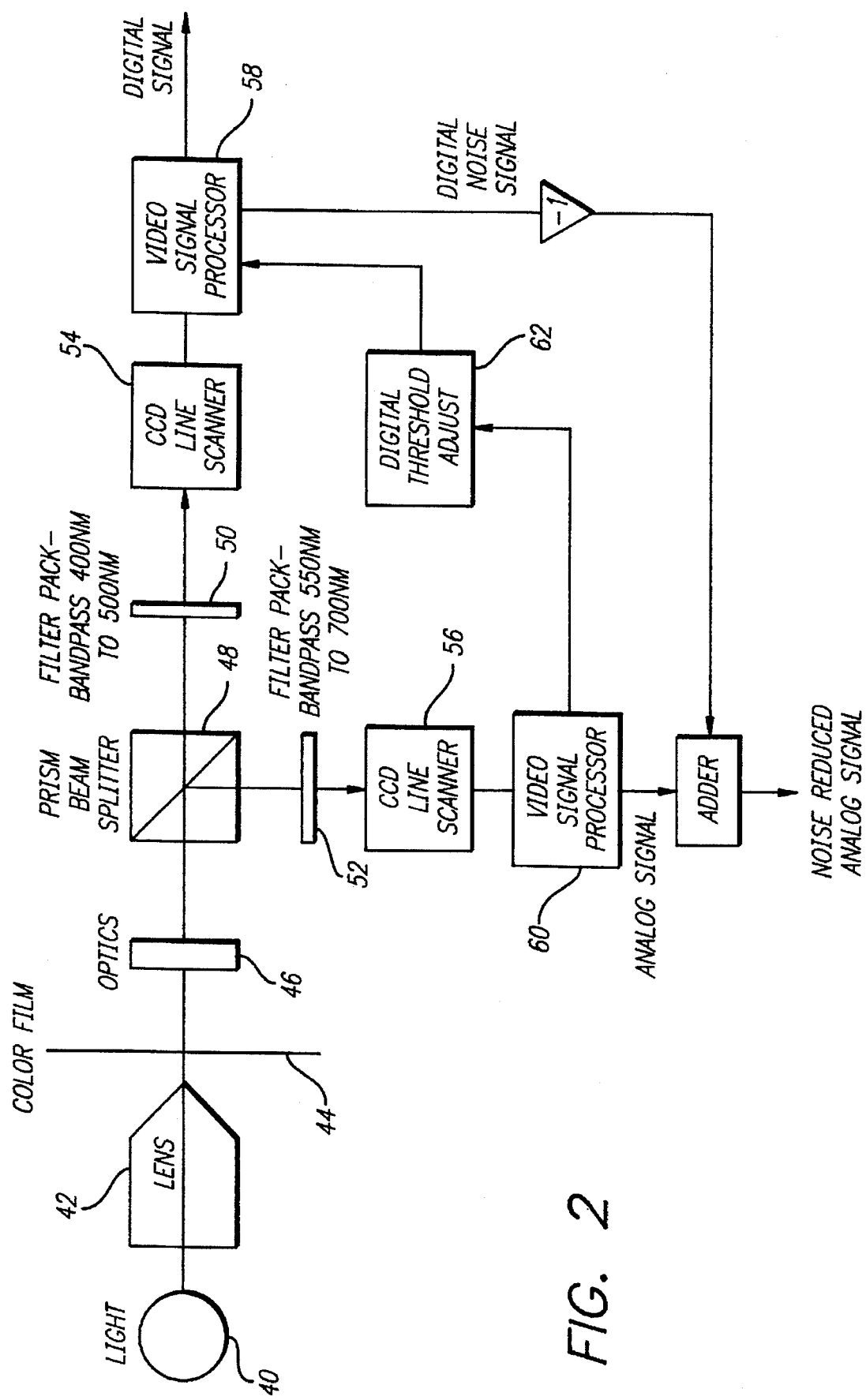
FIG. 2 is a block diagram of an alternate embodiment of the present invention.

Referring to FIGS. 1 and 2 in both embodiments of the present invention, the digital information is reproduced through the use of a blue light source centered at 450 nanometers where the yellow dye layer has maximum contrast and density.

As shown in FIG. 4 the cyan and magenta layers have minimum density in this region. Thus, the analog information will cause minimum modulation of the digital reader source.

Two coupled CCD scanners are used which are sent common soundtrack information. Each CCD incorporates a filter to read either the yellow digital or cyan/magenta analog modulation.

When a common reader is used, residual interference problems can be alleviated. For example, the analog information may be used to compensate for the slight digital "1" voltage level shift caused by the cyan/magenta layer modulation of the digital blue light source. Conversely, the digital information pattern can be read and used to generate a noise compensation signal to subtract from the residual digital noise picked up by the analog reader.

In order to minimize errors due to dirt on the soundtrack, in the preferred embodiments of the invention (FIGS. 4 and 5) a three component blue light source is used. The reason a blue light is used is that it is transmitted by the magenta and cyan dye layers but is substantially blocked by the yellow dye layer.

One light source is directed at 90 degrees to the film while the other two are positioned at approximately ±30 degrees, respectively. All three beams focus on the yellow layer. If a particle of dirt obscures the direct 90 degree light source, then the oblique light sources will provide the illumination for the reader.

The yellow dye layer will slightly modulate the reddish/ yellow light source used in standard analog readers. To combat this the bit layout will be done in such a way as to maintain equal areas of clear and opaque on each row. Since the analog reader detects the total amount of light transmission change over time, the technique of maintaining constant clear and opaque areas will substantially reduce pickup of digital noise by analog systems.

Specifically, the high data rate will result in a low level high frequency hiss noise in the analog systems. This hiss would be masked at high level signals, but may be objectionable at mid to low levels. Since the overlay analog track will actually reduce the digital area read by the analog, the noise floor will decrease with the analog signal. Further hiss reduction is achieved by blanking out the bits to the left and right of the soundtrack centerline. In this way levels below −10 db would see no background hiss. As the level increases beyond −10 db it will mask the presence of the background hiss. The blanked out columns could also be used to register the lateral location of the bits, thereby compensating for side film weave.

Present day film technology allows only an approximately 1.2 mil bit size on the yellow layer, or approximately 80 bits across. At a standard film speed of 18 inches per second, 15 k row of bits could be used. The total data rate would then be about 1.2 mb per second.

Release prints can be made from color negatives containing analog and digital information on separate dye layers. The printer light source will have to be modified to produce two narrow spectrum high intensity yellow and blue illumination.

Referring to FIG. 1, the first embodiment of the present invention is shown. A light source 10 in the projector (not shown) is focused through a lens 12 onto the color film 14. As the light goes through the color film it is modulated. Thereafter, the modulated light is split by a splitter 16 such that the portion of the modulated light containing the digital information will pass directly through the splitter 16 and the portion of the modulated light containing the analog information will be split and go into another direction. In the preferred embodiment, the splitter 16 is a prism beam splitter, although any other device can be used that will split the modulated light into its digital and analog components.

Through the use of optics 18, the modulated light containing the digital information is directed onto a scanner 20 so as to totally fill the scanner 20. In the preferred embodiment, scanner 20 is a CCD line scanner with only one line of sensors so it acts like a slit.

Before the modulated light containing the digital information goes onto the scanner 20, it is filtered by a filter 22 which in the preferred embodiment is a bandpass filter in the 400 nm to 500 nm range. The filter 22 filters the modulated information so that only the portion of the light that is blue is sent to the scanner 20. The information read by the scanner 20 is thereafter fed into a video signal processor 24, wherein it is later processed and decoded.

The modulated light containing the analog information goes through filter 26, which, in the preferred embodiment, is a bandpass filter in the 550 nm to 700 nm range. Filter 26 filters out the blue component of the light so that only the red and yellow components go through. Thereafter, the filtered modulated light containing the analog information is sent through a slit 28 to focus the light onto photoelectric device 30, wherein it is processed for decoding.

Referring now to FIG. 2, an alternate embodiment of the present invention is shown. A light source 40 in the projector (not shown) is focused through a lens 42 onto the color film 44. As the light goes through the color film it is modulated. Thereafter, the modulated light is fed through optics 46, which is the preferred embodiment is placed before beam splitter 48. Alternatively, the optics can be placed after the modulated light is split, before filters 50 and 52. Optics 46 causes the modulated light containing the digital and analog information to be directed onto scanners 54 and 56 so as to totally fill the scanner surface.

In the preferred embodiment of FIG. 2, after the light has been focused by optics 46, the focused modulated light is split by a beam splitter 48 such that the portion of the modulated light containing the digital information will pass directly through the splitter 48 and the portion of the modulated light containing the analog information will be split and go into another direction.

Before the modulated light containing the digital information goes onto the scanner 54, it is filtered by a filter 50 which in the preferred embodiment is a bandpass filter in the 400 nm to 500 nm range. The filter 50 filters the modulated information so that only the portion of the light that is blue is sent to the scanner 54. The information read by the scanner 54 is thereafter fed into a video signal processor 58.

The modulated light containing the analog information goes through filter 52, which in the preferred embodiment is a bandpass filter in the 550 nm to 700 nm range. Filter 52 filters out the blue component of the light so that only the red and yellow components go through. Thereafter, the filtered modulated light containing the analog information is scanned by scanner 56, which operates like a slit. Thereafter the scanned information is fed into video signal processor 60.

In the preferred embodiment, scanners 54 and 56 are CCD line scanners with only one line of sensors so they act like slits.

When the sound information is encoded onto the color film, the modulated analog information that has been placed on the cyan and magenta layers will be either clear or have cyan/magenta color. Even though blue will pass through the analog information, there still will be a difference between the clear and the cyan/magenta portions. Thus, in FIG. 2, when there is a portion of the modulated analog signal that is not clear in the video signal processor 60, the digital reading threshold in the video signal processor 58 is adjusted in the digital reading threshold adjust 62 to compensate for the blue light transmission loss through the cyan/magenta layers. By using this technique, the digital error rate will be decreased.

In addition, in FIG. 2, the modulated analog information will contain some digital modulation noise. A noise signal is generated by the digital video signal processor 58 and, thereafter, is inverted and subtracted from the analog signal to generate a second signal that is noise reduced.

As an alternative method to the present invention, the digital or other information could be encoded onto the magenta layer. If the magenta layer is used, very sharp filters would be needed to encode and decode the analog and digital information.

While particular embodiments and techniques of the present invention have been shown and illustrated herein, it will be understood that many changes, substitutions and modifications may be made by those persons skilled in the art. It will be appreciated from the above description of presently preferred embodiments and techniques that other configurations and techniques are possible and within the scope of the present invention. Thus, the present invention is not intended to be limited to the particular embodiments and techniques specifically discussed hereinabove.

What is claimed is:

1. A method for encoding and decoding analog and digital information on film having cyan, magenta and yellow layers, and having no silver emulsion, comprising:
    encoding the digital information on the yellow layer using spectral processing;
    encoding the analog information on the cyan and/or magenta layers using spectral processing;
    decoding the digital information using spectral processing; and
    decoding the analog information.

2. The method of claim 1 further comprising decoding the analog information using spectral processing.

3. The method of claim 3 wherein the decoding of the analog information is achieved by using a red LED or bandpassing white light in the 550 to 700 nanometer range.

4. A method for encoding and decoding analog and digital information on film having cyan, magenta and yellow layers, and having no silver emulsion, comprising:
    encoding the digital information on the yellow layer using spectral processing and digital bit manipulation to maintain adequate separation between the analog and digital information;
    encoding the analog information on the cyan and/or magenta layers;
    decoding the digital information using spectral processing and digital bit manipulation to maintain adequate separation between the analog and digital information; and
    decoding the analog information.

5. The method of claim 4 further comprising encoding the analog information using spectral processing.

6. The method of claim 5 further comprising decoding the analog information using spectral processing.

7. A method for encoding and decoding analog and other information on film having cyan, magenta and yellow layers, comprising:
    encoding the other information on the yellow layer;
    encoding the analog information on the cyan and/or magenta layers;
    decoding the other information; and
    decoding the analog information.

8. The method of claim 7, wherein the other information is encoded and decoded using spectral processing.

9. The method of claim 7, wherein the analog information is encoded and decoded using spectral processing.

10. The method of claim 7, wherein the other information is digital information which is encoded and decoded using digital bit manipulation.

11. A method for encoding and decoding analog and digital information on film having cyan, magenta and yellow layers, comprising:
    encoding the digital information on the yellow layer by spectral processing and digital bit manipulation to maintain adequate separation between the analog and digital information;
    encoding the analog information on the cyan and/or magenta layers;
    decoding the digital information by spectral processing and digital bit manipulation to maintain adequate separation between the analog and digital information;
    decoding the analog information.

12. A method for encoding and decoding analog and digital information on film having cyan, magenta and yellow layers, comprising:
    encoding the digital information on the yellow layer;
    encoding the analog information on the cyan and/or magenta layers;
    decoding the digital information by scanning and spectral processing the information to maintain adequate separation between the analog and digital information;
    modulating the analog information; and
    detecting the analog information with a photoelectric means.

13. The method of claim 12 further comprising encoding and decoding the digital information by digital bit manipulation.

14. The method of claim 12 further comprising:
    filtering the cyan and/or magenta analog modulation before it is read by the photoelectric means; and
    filtering the digital information before it is scanned.

15. A system for encoding and decoding analog and digital information on a specific area of films having cyan, magenta and yellow layers and no silver emulsion, comprising:
    means for arranging the digital information on the yellow layer of the color dye film such that each row of data has equal or nearly equal clear and opaque areas;
    means for encoding the analog information on the cyan and/or magenta layer;
    light source means directed at the color film in the area on which the analog information and digital is encoded, whereby the analog information encoded on the film modulates the light as the soundtrack passes through the projector;
    means for detecting the modulated light containing the analog information;
    scanning means for detecting the digital information; and
    processing means for processing the analog and digital information.

16. The system of claim 15 further comprising:
a first filtering means for reading the cyan and magenta analog modulation before it is read by the detection means; and
a second filtering means for reading the digital information before it is scanned by the scanning means.

17. The system of claim 15 wherein said reader light source means comprises three blue light sources and a light guide.

18. The system of claim 15 wherein said light source comprises means for transmitting through the analog information on the magenta and cyan dye layers and substantially blocked by the digital information on the yellow dye layer.

19. The system of claim 15 further comprising means for adjusting the digital threshold.

20. The system of claim 15 further comprising means for reducing digital noise on the processed analog information.

21. A system for encoding and decoding analog and digital information on color dye films having no silver emulsion, comprising:
a light source directed at the color film in the area on which the analog information is encoded, whereby the analog information encoded on the film modulates the light as the soundtrack passes through the projector;
means for detecting the modulated light containing the analog information;
means for arranging the digital information on the yellow layer of the color dye film such that each row of data has equal or nearly equal clear and opaque areas;
digital scanning means for detecting the digital information;
analog scanning means for detecting the analog information;
common reading means for using the analog information to compensate for the slight digital level shift caused by the cyan/magenta layer modulation of the digital blue light source, and for using the digital information to generate a noise signal to subtract from the residual digital noise picked up by the analog scanning means.

22. The system of claim 21 wherein the light source comprises three transmitting means for transmitting through the magenta and cyan dye layers and substantially blocked by the yellow dye layer, whereby one transmitting means is directed at 90 degrees to the film while the other two are positioned at oblique angles, respectively.

23. The system of claim 21 further comprising noise reducing means for blanking out the digital information to the left and right of the soundtrack centerline and whereby the blanked out digital information is used to register the lateral location of the bits, thereby compensating for side film weave.

24. The system of claim 21 a further comprising:
a first filtering means for reading the cyan/magenta analog modulation before it is read by the analog scanning means; and
a second filtering means for reading the digital information before it is scanned by the digital scanning means.

* * * * *